US010612860B2

(12) United States Patent
Ribarov et al.

(10) Patent No.: US 10,612,860 B2
(45) Date of Patent: Apr. 7, 2020

(54) MULTIPLE FLOW HEAT EXCHANGER

(71) Applicant: Hamilton Sundstrand Corporation, Charlotte, NC (US)

(72) Inventors: Lubomir A. Ribarov, West Hartford, CT (US); Leo J. Veilleux, Jr., Wethersfield, CT (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 450 days.

(21) Appl. No.: 15/161,957

(22) Filed: May 23, 2016

(65) Prior Publication Data
US 2017/0336149 A1  Nov. 23, 2017

(51) Int. Cl.
*F28D 9/00* (2006.01)
*B64D 33/02* (2006.01)
*F28F 3/08* (2006.01)
*F28F 13/06* (2006.01)
*F28F 27/02* (2006.01)
*F28D 21/00* (2006.01)

(52) U.S. Cl.
CPC .............. *F28D 9/0093* (2013.01); *F28F 3/08* (2013.01); *F28F 13/06* (2013.01); *F28F 27/02* (2013.01); *B64D 2033/024* (2013.01); *F28D 2021/0021* (2013.01); *F28D 2021/0026* (2013.01); *F28F 2250/104* (2013.01); *F28F 2250/106* (2013.01)

(58) Field of Classification Search
CPC .... F28D 1/0417; F28D 7/0075; F28D 7/0083; F28D 9/0093; F28D 2021/0026; F28F 3/08; F28F 13/06; F28F 27/02
See application file for complete search history.

(56) References Cited

U.S. PATENT DOCUMENTS

| 2,731,239 | A | * | 1/1956 | Andersen | F01P 11/08 |
| | | | | | 123/196 AB |
| 4,151,710 | A | * | 5/1979 | Griffin | F02C 7/14 |
| | | | | | 184/6.11 |
| 5,615,547 | A | * | 4/1997 | Beutin | F02C 7/14 |
| | | | | | 60/39.08 |
| 6,845,614 | B2 | * | 1/2005 | Stahlman | F01P 7/044 |
| | | | | | 137/884 |
| 8,899,062 | B2 | * | 12/2014 | Kadle | F25B 1/00 |
| | | | | | 62/333 |
| 9,004,154 | B2 | * | 4/2015 | Hagshenas | F01M 5/00 |
| | | | | | 165/279 |

(Continued)

FOREIGN PATENT DOCUMENTS

DE  102012010935 A1  12/2013
EP      2924385 A1   9/2015

(Continued)

OTHER PUBLICATIONS

Search Report dated Oct. 24, 2017 in U380746EP, EP Application No. 17172475.0, 6 pages.

*Primary Examiner* — Devon Russell
(74) *Attorney, Agent, or Firm* — Cantor Colburn LLP

(57) ABSTRACT

A heat exchanger to cool an oil flow with an air flow and a fuel flow includes at least one oil flow layer to receive the oil flow, an air flow layer to receive the air flow, wherein the air flow layer is in thermal communication with the at least one oil flow layer, and a fuel flow layer to receive the fuel flow, wherein the fuel flow layer is in thermal communication with the at least one oil flow layer.

15 Claims, 4 Drawing Sheets

(56) References Cited

U.S. PATENT DOCUMENTS

| | | | |
|---|---|---|---|
| 9,512,753 B2* | 12/2016 | Han | F01M 5/001 |
| 9,845,768 B2* | 12/2017 | Pesyna | F02K 1/1207 |
| 2008/0121376 A1* | 5/2008 | Schwarz | F01D 15/10 |
| | | | 165/104.28 |
| 2009/0159246 A1 | 6/2009 | Cornet | |
| 2010/0107603 A1* | 5/2010 | Smith | F02C 7/14 |
| | | | 60/267 |
| 2010/0186943 A1* | 7/2010 | Sun | F01D 25/18 |
| | | | 165/299 |
| 2013/0086909 A1* | 4/2013 | Wang | F02C 9/36 |
| | | | 60/730 |
| 2015/0176445 A1* | 6/2015 | Han | F01M 5/001 |
| | | | 123/568.12 |
| 2016/0076491 A1 | 3/2016 | Wilson et al. | |
| 2017/0184028 A1* | 6/2017 | Sennoun | F02C 7/224 |
| 2017/0311480 A1* | 10/2017 | Suzuki | H01L 23/473 |

FOREIGN PATENT DOCUMENTS

| | | |
|---|---|---|
| EP | 2995788 A1 | 3/2016 |
| EP | 3012437 A1 | 4/2016 |
| WO | 2015130356 A2 | 9/2015 |

* cited by examiner

MULTIPLE FLOW HEAT EXCHANGER

BACKGROUND

The subject matter disclosed herein relates to heat exchangers, and more particularly, to air-oil/fuel-oil coolers for aircraft.

Heat exchangers can be utilized within an aircraft to transfer heat from one fluid to another. Aircraft may use both air-cooled oil coolers and fuel-cooled oil coolers to extract thermal energy from oil to maintain oil within optimal operational temperature limits. Often, large thermal gradients between the oil and the ambient air of air cooled oil coolers may lead to thermal stress and further, the amount of fuel flow in fuel-cooled oil coolers may be insufficient to provide sufficient heat transfer capabilities.

BRIEF SUMMARY

According to an embodiment, a heat exchanger to cool an oil flow with an air flow and a fuel flow includes at least one oil flow layer to receive the oil flow, an air flow layer to receive the air flow, wherein the air flow layer is in thermal communication with the at least one oil flow layer, and a fuel flow layer to receive the fuel flow, wherein the fuel flow layer is in thermal communication with the at least one oil flow layer.

According to an embodiment, a proportioning device to direct an oil flow includes an inlet to receive the oil flow, an air cooled oil flow outlet to provide an air cooled oil flow, a fuel cooled oil flow outlet to provide a fuel cooled oil flow, and a proportioning valve to selectively direct the oil flow to at least one of the air cooled oil flow outlet and the fuel cooled oil flow outlet.

According to an embodiment, a method to cool an oil flow with an air flow and a fuel flow includes providing the oil flow to the air cooled oil flow layer and a fuel cooled oil flow layer, providing the air flow to an air flow layer, wherein the air flow layer is in thermal communication with the air cooled oil flow layer, providing a fuel flow to a fuel flow layer, wherein the fuel flow layer is in thermal communication with the fuel cooled oil flow layer, and selectively directing the oil flow between the air cooled oil flow layer and the fuel cooled oil flow layer via a proportioning valve.

Technical function of the embodiments described above includes that an air flow layer to receive the air flow, wherein the air flow layer is in thermal communication with the at least one oil flow layer, and a fuel flow layer to receive the fuel flow, wherein the fuel flow layer is in thermal communication with the at least one oil flow layer.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
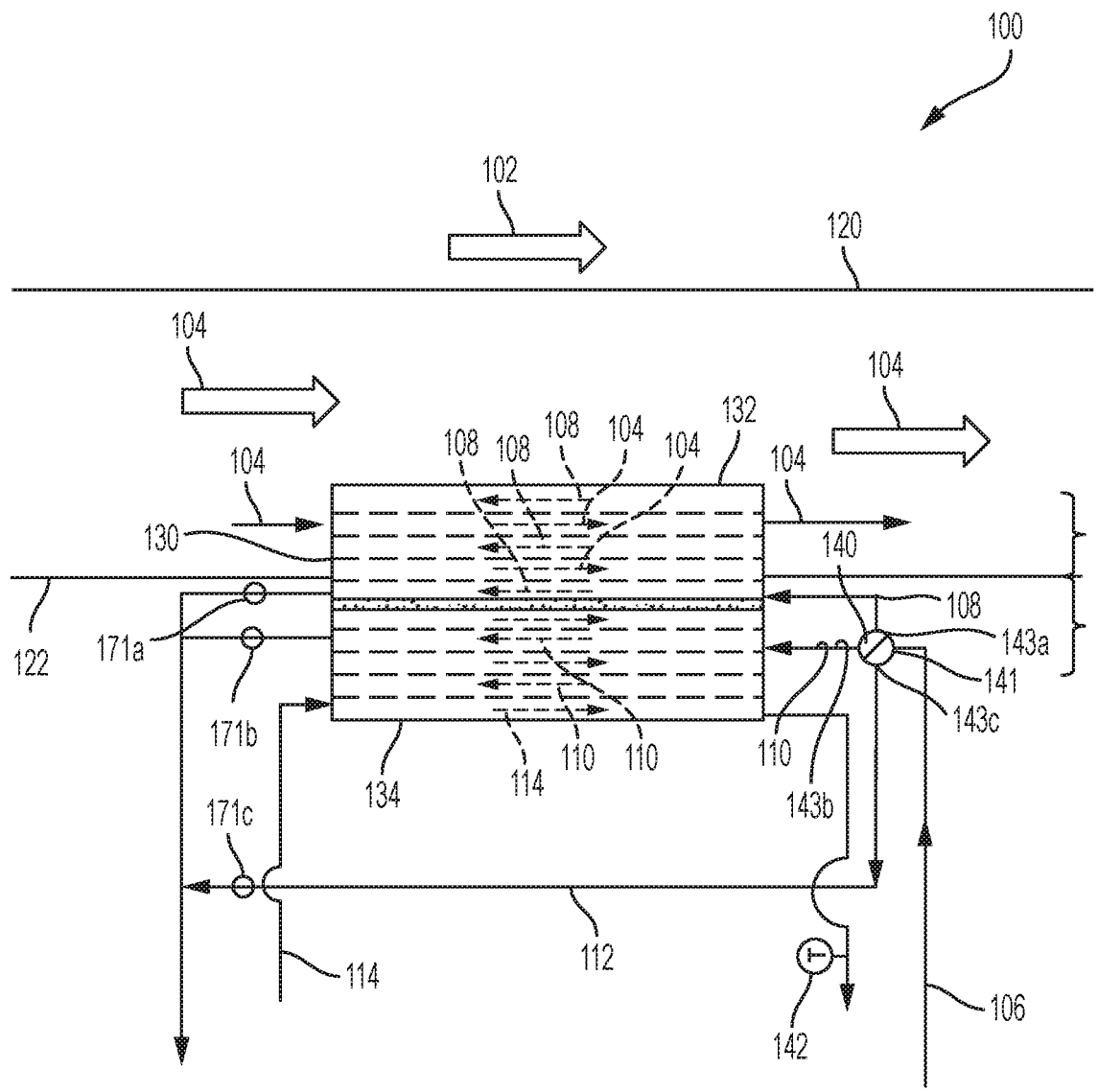
FIG. 1 is a schematic view of one embodiment of an oil cooling system.

Referring to the drawings, FIG. 1 shows an oil cooling system 100. In the illustrated embodiment, the oil cooling system includes a heat exchanger 130 and a proportioning valve 140 to cool an oil flow 106 using a fan air flow 104 and a fuel flow 114. In the illustrated embodiment, the heat exchanger 130 can simultaneously and selectively utilize the fan air flow 104 and the fuel flow 114 to cool the oil flow 106 in response to the temperature of the oil flow 106 and desired operating conditions. Advantageously, the oil cooling system 100 can provide desired levels of cooling in a compact design without exposing the heat exchanger 130 to large thermal gradients.

In the illustrated embodiment, the heat exchanger 130 includes an air cooled oil cooler 132 and a fuel cooled oil cooler 134 in a single unit. In the illustrated embodiment, portions of the oil flow 106 can be cooled by the air cooled oil cooler 132 while other portions of the oil flow 106 can be cooled by the fuel cooled oil cooler 134. In the illustrated embodiment, the air cooled oil cooler 132 is disposed to receive fan air flow 104 outside of the engine core cowl 122 and within the engine nacelle 120. Engine nacelle 120 separates fan air flow 104 from external air flow 102. In certain embodiments, the air cooled oil cooler 132 allows for cross flow heat transfer. In the illustrated embodiment, the fuel cooled oil cooler 134 of the heat exchanger 130 is disposed adjacent to the air cooled oil cooler 132 within the engine core cowl 122. In certain embodiments, the fuel cooled oil cooler 134 allows for cross flow, counter flow, or parallel flow heat transfer. In certain embodiments, the oil flow 106 can partially or fully bypass the heat exchanger 130. Advantageously, by selectively cooling the oil flow 106 through various cooling paths, the oil flow 106 can remain within a desired temperature range. Further, the heat exchanger 130 can prevent oil congealing and fuel degradation, while eliminating defrost systems, long fuel lines, and excess weight.

In the illustrated embodiment, the proportioning valve 140 can receive an oil flow 106 and direct portions of the oil flow 106 to the air cooled oil cooler 132, the fuel cooled oil cooler 134, or the bypass oil flow 112. In the illustrated embodiment, the proportioning valve 140 includes an inlet 141, an air cooled oil flow outlet 143a, a fuel cooled oil flow outlet 143b, and a bypass oil flow outlet 143c. Advantageously, the proportioning valve 140 can direct the oil flow 106 for optimal thermal and fuel burn conditions.

In the illustrated embodiment, oil flow 106 is received by the proportioning valve inlet 141. In certain embodiments, the oil flow 106 is received from an oil pump or any other suitable component of an aircraft lubrication system. After the oil flow 106 is received, the proportioning valve 140 can direct the oil flow 106 to at least one of the air cooled oil flow outlet 143a, the fuel cooled oil flow outlet 143b, and the bypass oil flow outlet 143c in any combination and proportion.

In the illustrated embodiment, the air cooled oil flow outlet 143a can direct an air cooled oil flow 108 to the air cooled oil cooler 132 portion of the heat exchanger 130. In the illustrated embodiment, the fuel cooled oil flow outlet 143b can direct a fuel cooled oil flow 110 to the fuel cooled oil cooler 134 portion of the heat exchanger. In the illustrated embodiment, the bypass oil flow outlet 143c can direct a bypass oil flow 112 beyond the heat exchanger 130 as required. In certain embodiments and conditions, such as when the temperature of the oil flow 106 is low, the heat exchanger 130 can be bypassed to allow the oil flow 106 to achieve a desired temperature range.

As each of the oil flows 108, 110, and 112 passes or bypasses the heat exchanger 130, the oil flows 108, 110, 112 can be rejoined before continuing through the oil system. In certain embodiments, the cooled combined oil flow can be directed to an aircraft engine main bearings or to any other suitable component.

In certain embodiments, temperature sensors 171a-c can monitor the temperature of each of the oil flows 108, 110, and 112. Temperature sensors 171a-c can provide continuous feedback of the oil flow 108, 110, 112 temperature to aircraft computers or any other suitable control system. Temperature readings from the temperature sensors 171a-c can be utilized to adjust or modulate the proportioning valve 140 to provide optimal thermal and fuel burn conditions. Further, the temperature readings from the temperature sensors 171a-c can provide parameters regarding the performance of the heat exchanger 130.

In the illustrated embodiment, the air cooled oil cooler 132 receives the air cooled oil flow 108 and transfers heat to the fan air flow 104. In the illustrated embodiment, the air cooled oil cooler 132 is at least partially disposed outside the engine core cowl 122 to expose the air cooled oil cooler 132 to the fan air flow 104.

In the illustrated embodiment, the fuel cooled oil cooler 134 receives the fuel cooled oil flow 110 and transfers heat to the fuel flow 114. In the illustrated embodiment, the fuel cooled oil cooler 134 is disposed adjacent to the air cooled oil cooler 132 to allow heat transfer between the fuel cooled oil cooler 134 and the air cooled oil cooler 132. In the illustrated embodiment, the fuel flow 114 is received from a fuel pump or any other suitable fuel system component. Fuel flow 114 can be returned to the fuel system after passing through the fuel cooled oil cooler 134. In certain embodiments, a fuel temperature sensor 142 can monitor the temperature of the fuel flow 114 to determine if the fuel flow temperature exceeds optimal temperature range which may result in thermal breakdown of the fuel.

Figure 2:
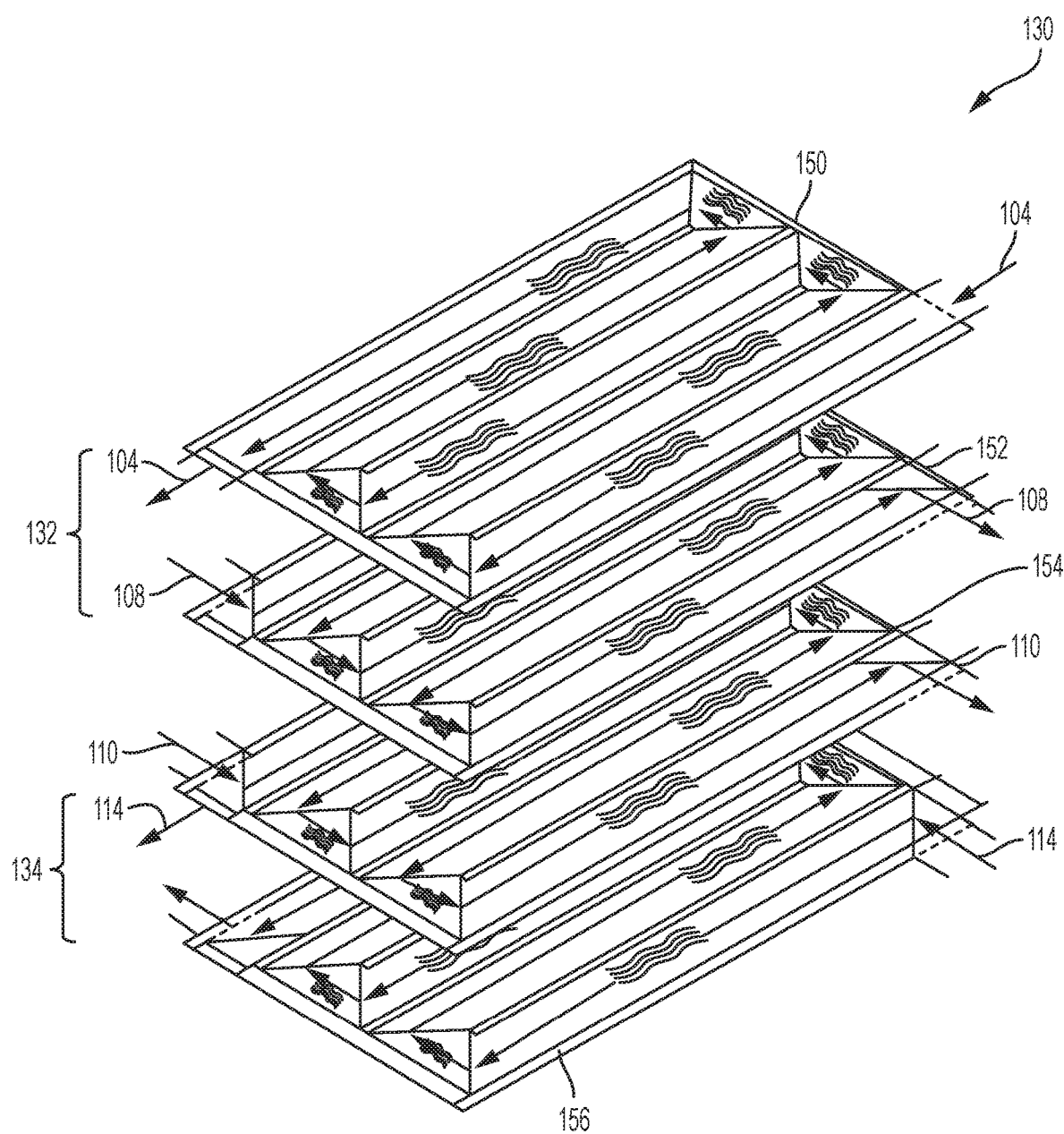
FIG. 2 is a pictorial view of one embodiment of a heat exchanger for use with the oil cooling system of FIG. 1.

Referring to FIG. 2, the heat exchanger 130 is shown. In the illustrated embodiment, the air cooled oil cooler 132 includes an air flow layer 150 and a first oil flow layer 152 and the fuel cooled oil cooler 134 includes a second oil flow layer 154, and a fuel flow layer 156. The heat exchanger 130 can include any suitable configuration of the layers 150, 152, 154, 156 wherein heat exchanger layers 150, 152, 154, 156 can be in an oil layer to oil layer interface, a fuel layer to oil layer interface, or an air layer to oil layer interface.

In the illustrated embodiment, the air cooled oil cooler 132 includes the air flow layer 150. The air flow layer 150 receives the fan air flow 104. The fan air flow 104 is directed through the air flow layer 150 to receive heat from the air cooled oil flow 108. In the illustrated embodiment, the air cooled oil flow 108 is directed through the first oil flow layer 152. In the illustrated embodiment, the air flow layer 150 and the first oil flow layer 152 are in thermal communication to transfer heat therebetween.

In the illustrated embodiment, the fuel cooled oil cooler 134 includes the fuel flow layer 156. The fuel flow layer 156 receives the fuel flow 114. The fuel flow 114 is directed through the fuel flow layer 156 to receive heat from the fuel cooled oil flow 110. In the illustrated embodiment, the fuel cooled oil flow 110 is directed through the second oil flow layer 156. In the illustrated embodiment, the fuel flow layer 156 and the second oil flow layer 156 are in thermal communication to transfer heat therebetween.

In the illustrated embodiment, the air cooled oil cooler 132 and the fuel cooled oil cooler 134 are in thermal communication. In the illustrated embodiment, the first oil flow layer 152 and the second oil flow layer 154 are in thermal communication therebetween, however, in other embodiments, any suitable layer of the heat exchanger 130 can be in thermal communication with any other suitable layer of the heat exchanger 130.

Advantageously, due to the co-location of the air cooled oil cooler 132 and the fuel cooled oil cooler 134, oil flow 110 within the fuel cooled oil cooler 134 may provide preheating of the oil flow 108 within the air cooled oil cooler 132, resulting in uniform thermal load distribution within the air cooled oil cooler 132. Advantageously, the uniform thermal load distribution can minimize thermal stress within the heat exchanger 130.

Further, during conditions of low fuel flow, such as "flight idle" conditions, the heat exchanger 130 can prevent fuel flow 114 degradation (i.e. fuel coking, varnishing, tarring, etc.) by redirecting oil flow 106 to the air cooled oil cooler 132 instead of the fuel cooled oil cooler 134.

Figure 3:
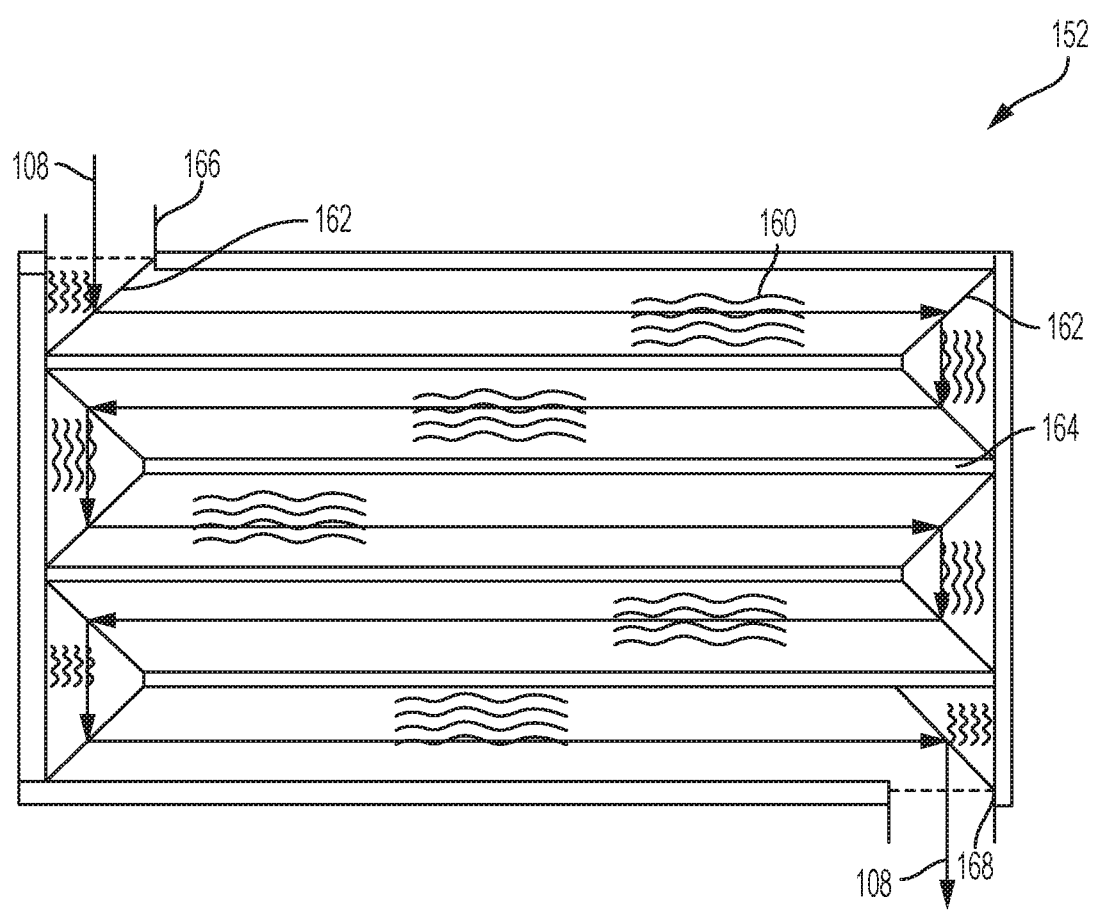
FIG. 3 is a pictorial view of one embodiment of a heat exchanger layer for use with the heat exchanger of FIG. 2.

Referring to FIG. 3, the first oil flow layer 152 is shown as a representative layer of the heat exchanger 130. In the illustrated embodiment, each of the layers 150, 152, 154, 156 (as shown in FIG. 2) can be represented by the representative layer 152. In the illustrated embodiment, the first oil flow layer 152 includes an inlet 166, channels 160, and an outlet 168. In the illustrated embodiment, each of the layers 150, 152, 154, 156 flows in a counter-flow manner to its adjacent fluid path.

In the illustrated embodiment, air cooled oil flow 108 is directed into the first oil flow layer 152 via the inlet 166. The air cooled oil flow 108 is directed through channels 160. The channels 160 are formed by a plurality of flow passages defined between alternating sidewalls. The sidewalls have a first portion extending in one direction across a nominal flow direction, and leading into a second wall portion extending in an opposed direction. The overall effect is that the flow paths resemble herringbone designs. In the illustrated embodiment, air cooled oil flow 108 can effectively transfer heat via channels 160. Advantageously, the resulting high density fin count that is provided allows high heat transfer within the heat exchanger 130.

Within the first oil flow layer 152, the air cooled oil flow 108 can be directed by utilizing spacing bars 164. In the illustrated embodiment, spacing bars 164 can direct flow in an intended direction as flow travels within channels 160. In the illustrated embodiment, mitered interfaces 162 can be utilized to turn or otherwise redirect flow to create a longer flow path or an otherwise desired flow path within a compact footprint. After the air cooled oil flow 108 passes through the first oil flow layer 152, the air cooled oil flow 108 exits through outlet 168.

In certain embodiments, the heat exchanger structures described herein can be manufactured by conventional techniques such as metal-forming techniques to stamp the herringbone conduits/channels into the proper configuration to accommodate the intended heat exchanger performance. The materials are not limited to metals and for some applications, polymer heat exchangers can also be utilized. In certain embodiments, additive manufacturing is used to fabricate any part of or all of the heat exchanger structures. Additive manufacturing techniques can be used to produce a wide variety of structures that are not readily producible by conventional manufacturing techniques.

In certain embodiments, the heat exchanger can be manufactured by advanced additive manufacturing ("AAM") techniques such as (but not limited to): selective laser sintering (SLS) or direct metal laser sintering (DMLS), in which a layer of metal or metal alloy powder is applied to the workpiece being fabricated and selectively sintered according to the digital model with heat energy from a directed laser beam. Another type of metal-forming process includes selective laser melting (SLM) or electron beam melting (EBM), in which heat energy provided by a directed laser or electron beam is used to selectively melt (instead of sinter) the metal powder so that it fuses as it cools and solidifies.

In certain embodiments, the heat exchanger can made of a polymer, and a polymer or plastic forming additive manufacturing process can be used. Such process can include stereolithography (SLA), in which fabrication occurs with the workpiece disposed in a liquid photopolymerizable composition, with a surface of the workpiece slightly below the surface of the liquid composition. Ultraviolet (UV) light from a laser or other coherent light beam is used to selectively photopolymerize a layer onto the workpiece, following which it is lowered further into the liquid composition by an amount corresponding to a layer thickness and the next layer is formed.

Polymer components can also be fabricated using selective heat sintering (SHS), which works analogously for thermoplastic powders to SLS for metal powders. Another additive manufacturing process that can be used for polymers or metals is fused deposition modeling (FDM), in which a metal or thermoplastic feed material (e.g., in the form of a wire or filament) is heated and selectively dispensed onto the workpiece through an extrusion nozzle.

Figure 4:
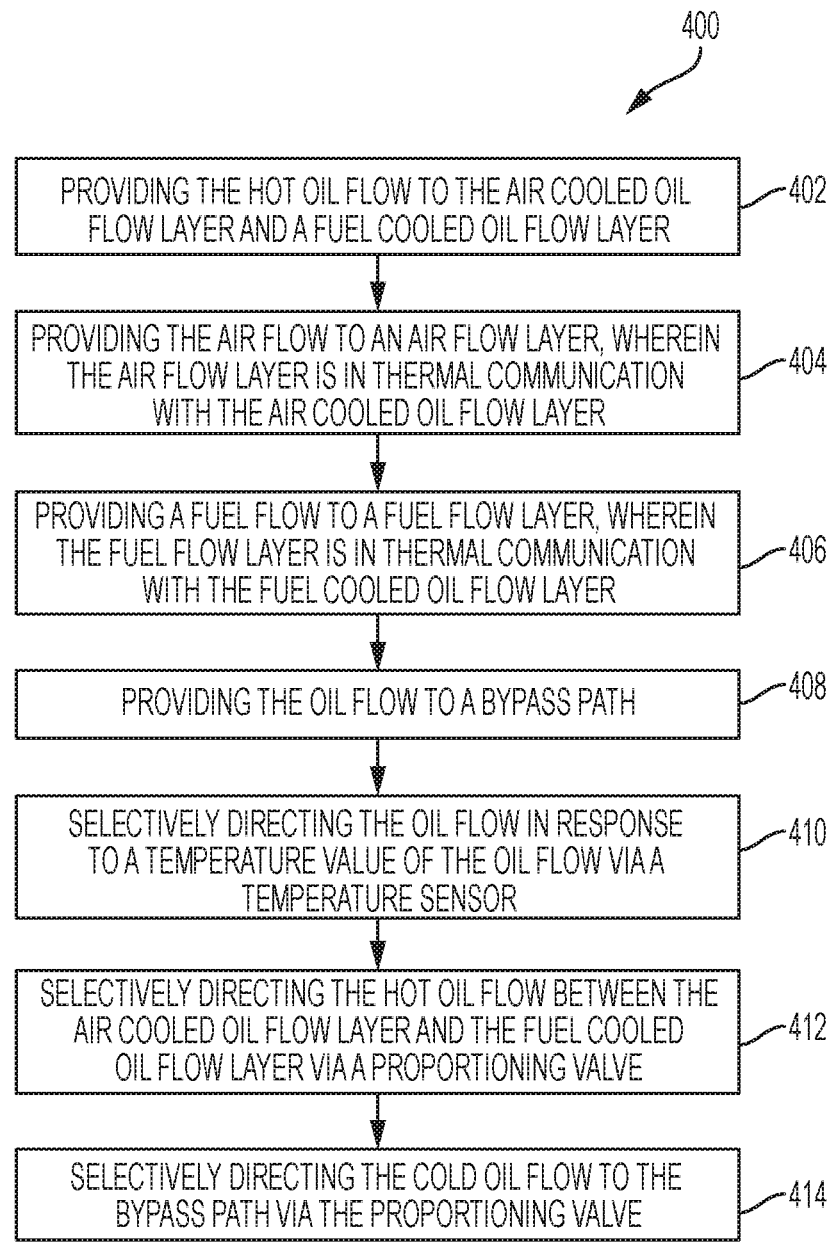
FIG. 4 is a flow chart of an embodiment of a method to cool oil.

Referring to FIG. 4, a method 400 to cool an oil flow is shown. In operation 402, the hot oil flow is provided to the air cooled oil flow layer and a fuel cooled oil flow layer. In the illustrated embodiment, the air cooled oil flow is directed through the first oil flow layer. In the illustrated embodiment, the fuel cooled oil flow is directed through the second oil flow layer. In certain embodiments, at least one of the air cooled oil flow layer and a fuel cooled oil flow layer includes herringbone channels.

In operation 404, the air flow is provided to an air flow layer, wherein the air flow layer is in thermal communication with the air cooled oil flow layer. In the illustrated embodiment, the air flow layer and the first oil flow layer are in thermal communication to transfer heat therebetween. In certain embodiments the air flow layer includes herringbone channels.

In operation 406, a fuel flow is provided to a fuel flow layer, wherein the fuel flow layer is in thermal communication with the fuel cooled oil flow layer. In the illustrated embodiment, the fuel flow layer and the second oil flow layer are in thermal communication to transfer heat therebetween. In certain embodiments, the fuel flow layer includes herringbone channels.

In operation 408, the oil flow is provided to a bypass path. In certain embodiments and conditions, such as when the temperature of the oil flow is low, the heat exchanger can be bypassed to allow the oil flow to achieve a desired temperature range.

In operation 410, the oil flow is selectively directed in response to a temperature value of the oil flow via a temperature sensor. Temperature sensors can provide continuous feedback of the oil flow temperature to aircraft computers or any other suitable control system. Temperature readings from the temperature sensors can be utilized to adjust or modulate the proportioning valve to provide optimal thermal and fuel burn conditions.

In operation 412, the hot oil flow is selectively directed between the air cooled oil flow layer and the fuel cooled oil flow layer via a proportioning valve. In operation 414, the cold oil flow is selectively directed to the bypass path via the proportioning valve. In the illustrated embodiment, oil flow is received by the inlet of the proportioning valve (as shown in FIG. 1). After the oil flow is received, the proportioning valve can direct the oil flow to at least one of the air cooled oil flow outlet, the fuel cooled oil flow outlet, and the bypass oil flow outlet, in any combination and proportion.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A heat exchanger to cool an oil flow with an air flow and a fuel flow, the heat exchanger comprising:
   at least one oil flow layer to receive the oil flow, the at least one oil flow layer including an air cooled oil flow layer and a fuel cooled oil flow layer,
   the air cooled oil flow layer being disposed adjacent to an air flow layer and the fuel cooled oil flow layer being disposed adjacent to a fuel flow layer, and
   the air cooled oil flow layer and the fuel cooled oil flow layer are adjacent to one another in an oil layer to oil layer interface, wherein:
   the air flow layer is configured to receive the air flow, wherein the air flow layer is in thermal communication with the air cooled oil flow layer of the at least one oil flow layer; and
   the fuel flow layer is configured to receive the fuel flow, wherein the fuel flow layer is in thermal communication with the fuel cooled oil flow layer of the at least one oil flow layer,
   wherein patterns of oil flows through the air and fuel cooled oil flow layers are the same along entire lengths of each of the air and fuel cooled oil flow layers.

2. The heat exchanger of claim 1, further comprising a proportioning valve to direct the oil flow between the air cooled oil flow layer and the fuel cooled oil flow layer.

3. The heat exchanger of claim 2, further comprising a bypass path.

4. The heat exchanger of claim 3, wherein the proportioning valve selectively directs the oil flow to the bypass path.

5. The heat exchanger of claim 2, wherein the proportioning valve selectively directs the oil flow between the air cooled oil flow layer, the fuel cooled oil flow layer, and the bypass path.

6. The heat exchanger of claim 1, further comprising a temperature sensor in thermal communication with the oil flow.

7. The heat exchanger of claim 1, wherein the heat exchanger is disposed at an engine core cowl interface.

8. The heat exchanger of claim 1, wherein at least one of the oil flow layer, the fuel flow layer, and the air flow layer includes herringbone channels.

9. The heat exchanger of claim 1, wherein respective entireties of the air cooled oil flow layer, the air flow layer, the fuel cooled oil flow layer and the fuel flow layer are all parallel.

10. An oil cooling system, comprising:
an engine nacelle comprising an engine core cowl interface; and
a heat exchanger disposed at the engine core cowl interface, the heat exchanger comprising an air cooled oil cooler and a fuel cooled oil cooler in a single unit comprising:
an oil flow layer receptive of an oil flow and comprising an air cooled oil flow layer and a fuel cooled oil flow layer,
the air cooled oil flow layer being adjacent to an air flow layer, the fuel cooled oil flow layer being disposed adjacent to a fuel flow layer and the air cooled oil flow layer and the fuel cooled oil flow layer are disposed adjacent to one another in an oil layer to oil layer interface, wherein:
the air flow layer is receptive of an air flow from a fan air flow within the engine nacelle and is thermally communicative with the air cooled oil flow layer; and
the fuel flow layer is receptive of a fuel flow and is thermally communicative with the fuel cooled oil flow layer,
wherein patterns of oil flows through the air and fuel cooled oil flow layers are the same along entire lengths of each of the air and fuel cooled oil flow layers.

11. The oil cooling system according to claim 10, wherein:
the air cooled oil cooler of the single unit comprises the air cooled oil flow layer and the air flow layer,
the fuel cooled oil cooler of the single unit comprises the fuel cooled oil flow layer and the fuel flow layer, and
a portion of the air cooled oil cooler is disposed within the engine nacelle, a remaining portion of the air cooled oil cooler is disposed at an exterior of the engine nacelle and an entirety of the fuel cooled oil cooler is disposed at the exterior of the engine nacelle.

12. The oil cooling system according to claim 10, wherein the air cooled oil flow layer and the fuel cooled oil flow layer disposed in the oil layer to oil layer interface are adjacent to one another between the air flow layer and the fuel flow layer.

13. The oil cooling system according to claim 10, wherein respective entireties of the air cooled oil flow, the air flow layer, the fuel cooled oil flow layer and the fuel flow layer are all parallel.

14. The oil cooling system according to claim 10, further comprising:
a bypass oil flow line; and
a proportioning valve upstream from the air cooled oil flow layer, the fuel cooled oil flow layer and the bypass oil flow line.

15. The oil cooling system according to claim 14, further comprising temperature sensors disposed downstream from the air cooled oil flow layer, the fuel cooled oil flow layer and at a downstream section of the bypass oil flow line.

* * * * *